US012725724B2

(12) United States Patent
Fuller et al.

(10) Patent No.: US 12,725,724 B2
(45) Date of Patent: Sep. 1, 2026

(54) MAGNET ASSEMBLY FOR INCLUSION WITHIN A MOTOR ASSEMBLY

(71) Applicant: Systematic Audio, LLC, Knoxville, TN (US)

(72) Inventors: Jacob Aaron Fuller, Newton, NC (US); Murilo Kulczynski Alvares, Brossard (CA)

(73) Assignee: Systematic Audio, LLC, Knoxville, TN (US)

( * ) Notice: Subject to any disclaimer, the term of this patent is extended or adjusted under 35 U.S.C. 154(b) by 288 days.

(21) Appl. No.: 18/448,583

(22) Filed: Aug. 11, 2023

(65) Prior Publication Data

US 2025/0054667 A1 Feb. 13, 2025

(51) Int. Cl.
*H01F 7/02* (2006.01)
*H04R 9/02* (2006.01)
*H04R 9/06* (2006.01)

(52) U.S. Cl.
CPC .......... *H01F 7/0205* (2013.01); *H04R 9/025* (2013.01); *H04R 9/06* (2013.01)

(58) Field of Classification Search
None
See application file for complete search history.

(56) References Cited

U.S. PATENT DOCUMENTS 3,979,566 A 9/1976 Willy
5,786,741 A 7/1998 Leibzon
6,047,077 A 4/2000 Larsen
6,795,564 B2 9/2004 Zhang
7,065,225 B2 6/2006 Stiles
7,477,757 B2 1/2009 Stiles
7,757,376 B2 7/2010 Saitou et al.
8,571,252 B2 10/2013 North et al.
8,948,441 B2 2/2015 Zhao
8,983,112 B2 3/2015 Zhao
8,995,703 B2 3/2015 Tlkorur
9,071,898 B2 6/2015 Cazes Bouchet
9,219,962 B2 12/2015 Hunstable
9,532,145 B2 12/2016 Niedermann
10,681,467 B2 6/2020 Lee et al.
2005/0041831 A1 2/2005 Stiles et al.
2006/0093180 A1 5/2006 Kim
2006/0239496 A1* 10/2006 Stiles .................... H04R 9/025
381/396

(Continued)

FOREIGN PATENT DOCUMENTS

WO 2013047792 A1 4/2013
WO 2019226323 A1 11/2019

*Primary Examiner* — Bernard Rojas
(74) *Attorney, Agent, or Firm* — Seth L. Hudson; Maynard Nexsen PC

(57) ABSTRACT

A magnet assembly for a speaker device that includes a plate member with a plurality of cylindrical bores disposed within the plate member and contains an opening within an upper surface of the plate member. A plurality of cylindrical stands are positioned within each cylindrical bore and extending to a length within the cylindrical bore, leaving a void defined by the distance between an opening of the cylindrical bore to the stand. A plurality of cylindrical magnets are positioned within each cylindrical bore of the plate member and adjacent the stand within each cylindrical bore, wherein the magnets substantially occupy the void.

4 Claims, 11 Drawing Sheets

(56) References Cited

U.S. PATENT DOCUMENTS

| | | | | |
|---|---|---|---|---|
| 2006/0239499 | A1* | 10/2006 | Stiles | H04R 9/025 381/421 |
| 2007/0160257 | A1* | 7/2007 | Stiles | H04R 9/025 381/407 |
| 2008/0025552 | A1 | 1/2008 | Dohi et al. | |
| 2008/0205688 | A1 | 8/2008 | Sato | |
| 2011/0007913 | A1 | 1/2011 | Nielsen | |
| 2017/0279321 | A1 | 9/2017 | Gong et al. | |
| 2017/0332173 | A1 | 11/2017 | Gerkinsmeyer | |

* cited by examiner

MAGNET ASSEMBLY FOR INCLUSION WITHIN A MOTOR ASSEMBLY

FIELD OF THE INVENTION

The present invention relates generally to a magnet assembly for inclusion within a motor assembly, and more generally relates to a magnet assembly that includes a plate member containing a plurality of cylindrical bores, wherein a plurality of cylindrical magnets are disposed within the cylindrical bores.

BACKGROUND OF THE INVENTION

Audio speakers are well known and widely used for transmitting audio sound. Audio speakers use electrical signals to produce air pressure waves which are perceived as sounds. Audio speakers may use a diaphragm that is movably suspended in a frame. The diaphragm is coupled to a voice coil that is suspended in a magnetic field. The electrical signals representing the sound flow through the voice coil and interact with the magnetic field. This causes the voice coil and the coupled diaphragm to oscillate in response to the electrical signal. The oscillation of the diaphragm produces air pressure waves.

It is desirable for a loudspeaker to have a magnet with high energy while minimizing the volume of material used. The invention reduces the required magnet volume for a certain magnetization requirement.

BRIEF SUMMARY OF THE INVENTION

According to an embodiment of the present invention, a magnet assembly for a speaker device includes a plate member with at least one cylindrical bore disposed within the plate member, and at least one cylindrical magnet positioned within the cylindrical bore of the plate member.

According to yet another embodiment of the present invention, the magnet assembly for a speaker device includes an annular plate member.

According to yet another embodiment of the present invention, the magnet assembly for a speaker device includes a plurality of cylindrical bores are disposed within the plate member, and a plurality of cylindrical magnets, wherein the total number of magnets is equal to the number of cylindrical bores disposed within the plate member and each magnet is positioned within a cylindrical bore of the plate member.

According to yet another embodiment of the present invention, the magnet assembly for a speaker device includes a shorting ring adjacent the plate member.

According to yet another embodiment of the present invention, the magnet assembly for a speaker device includes a stand disposed within the at least one cylindrical bore and at least one cylindrical magnet is disposed adjacent the stand within the at least one cylindrical bore.

According to yet another embodiment of the present invention, the magnet assembly for a speaker device includes a plurality of cylindrical bores disposed within the plate member, a plurality of stands disposed within the plurality of cylindrical bores, and a plurality of cylindrical magnets, wherein the total number of stands and cylindrical magnets is equal to the number of cylindrical bores disposed within the plate member and each cylindrical magnet disposed within the cylindrical bore is position adjacent the stand within the cylindrical bore of the plate member.

According to yet another embodiment of the present invention, the magnet assembly for a speaker device includes a cylindrical stand.

According to yet another embodiment of the present invention, the magnet assembly for a speaker device includes a neo-magnet.

According to yet another embodiment of the present invention, the magnet assembly for a speaker device includes a plate member composed of steel.

According to yet another embodiment of the present invention, the magnet assembly for a speaker device includes a plate member with a plurality of cylindrical bores disposed within the plate member, and a plurality of cylindrical magnets positioned within each cylindrical bore of the plate member.

According to yet another embodiment of the present invention, the magnet assembly for a speaker device includes a plate member with a plurality of cylindrical bores disposed within the plate member and contains an opening within an upper surface of the plate member. A plurality of cylindrical stands are positioned within each cylindrical bore and extending to a length within the cylindrical bore, leaving a void defined by the distance between an opening of the cylindrical bore to the stand. A plurality of cylindrical magnets positioned within each cylindrical bore of the plate member and adjacent the stand within each cylindrical bore, wherein the magnets substantially occupy the void.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
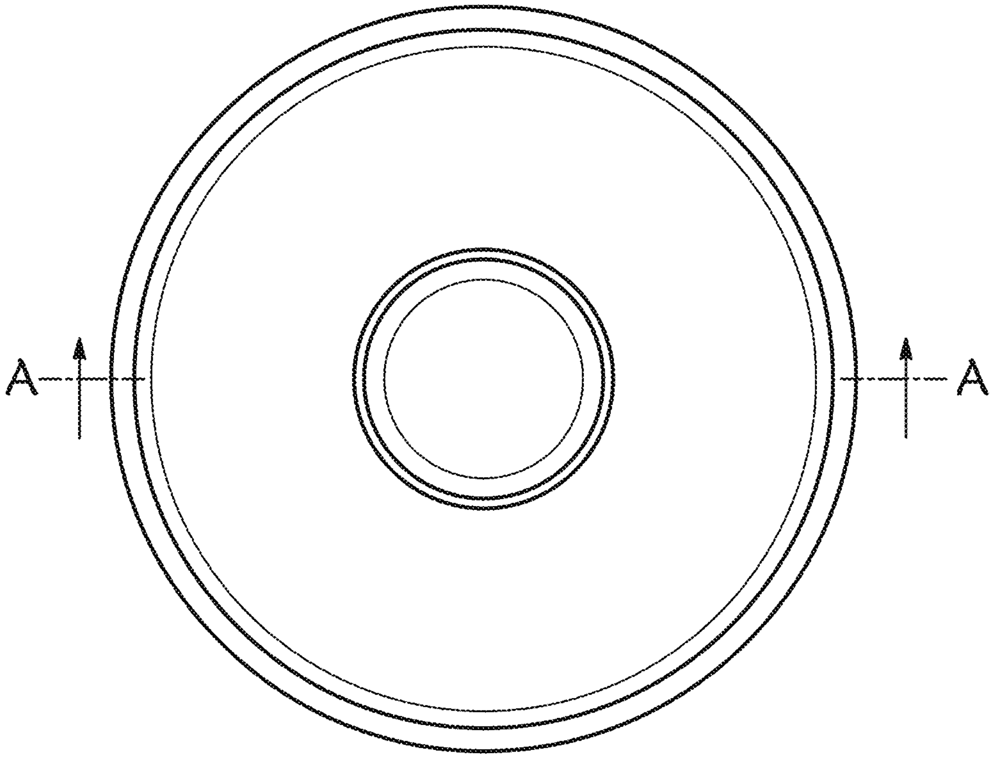
FIG. 1 PRIOR ART
FIG. 1 is a top view of a prior art magnet assembly within a motor assembly.
Figure 2:
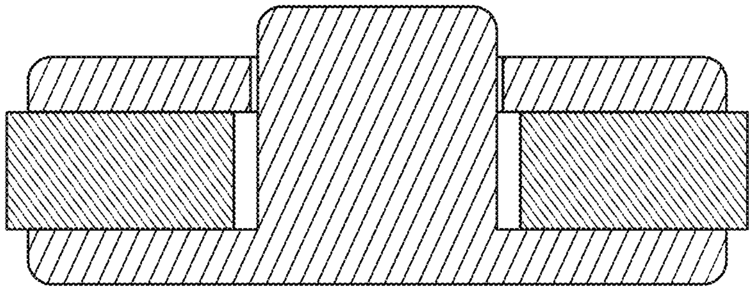
FIG. 2 PRIOR ART
FIG. 2 is a cut-away view along the line A-A of FIG. 1.

Prior art assemblies comprise a solid annular steel plate as shown in FIGS. 1-2. In the present invention, a magnet assembly is illustrated in FIGS. 3-11 and is shown generally at reference numeral 10. The magnet assembly 10 includes a plate member 12 and a plurality of magnets 14. The plate member 12 has an annular structure and a plurality of circular bores 16 for receiving the plurality of magnets 14. The bores 16 are disposed along the axial direction of the plate member 12, preferably spaced evenly apart, for receiving the plurality of magnets 14. The number of magnets 14 preferably coincides with the number of bores 16 disposed within the plate member 12.

The plate member 12 may be composed of steel, or alternatively the plate member 12 may be a ferrite magnet, which may be composed of Iron Oxide ($Fe_2O_3$) and blended with metallic elements, such as strontium, barium, manganese, nickel, and/or zinc. The plate member 12 may be composed of a single piece of steel, or alternatively, at least two identically shaped plates engaged together, or a plurality of identically shaped plates engaged together forming a single plate member 12. The magnets 14 may be a neodymium magnet ("neo magnet"), which is a permanent magnet made from an alloy of neodymium, iron, and boron to form a $Nd_2Fe_{14}B$ tetragonal crystalline structure. The neo magnet may be plated or coated prior to use in the present invention. Commonly, the neo magnet may be nickel plated. The magnets 14, as illustrated, are smaller than the plate member 12 and cost more than the plate member 12. The plate member 12 allows the use of smaller magnets 14, reducing the required weight and volume of the magnets 14 to reach a specific performance target. The plate member 12 may have the same magnetic properties and polarity as magnets 14.

Figure 3:
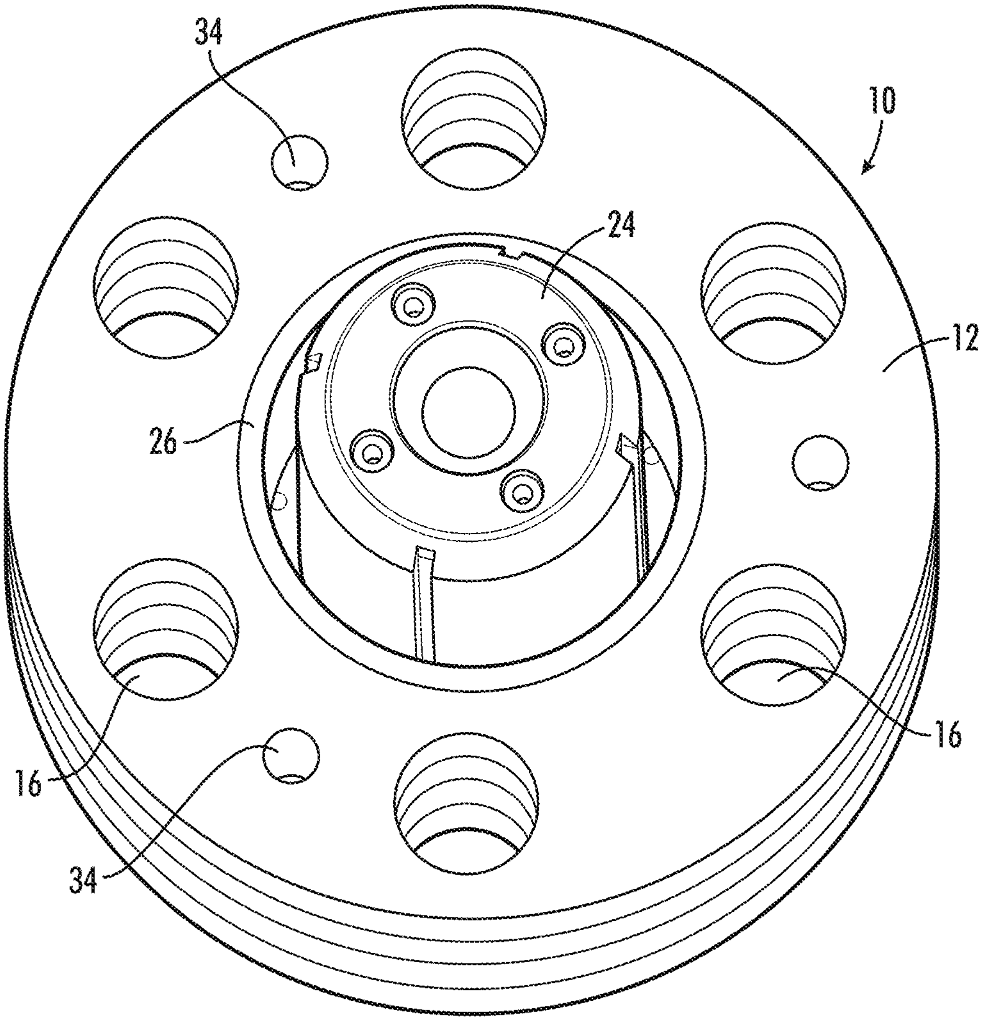
FIG. 3 is a top perspective view of a plate member of the present invention encircling an exemplary pole piece of a motor assembly.
Figure 4:
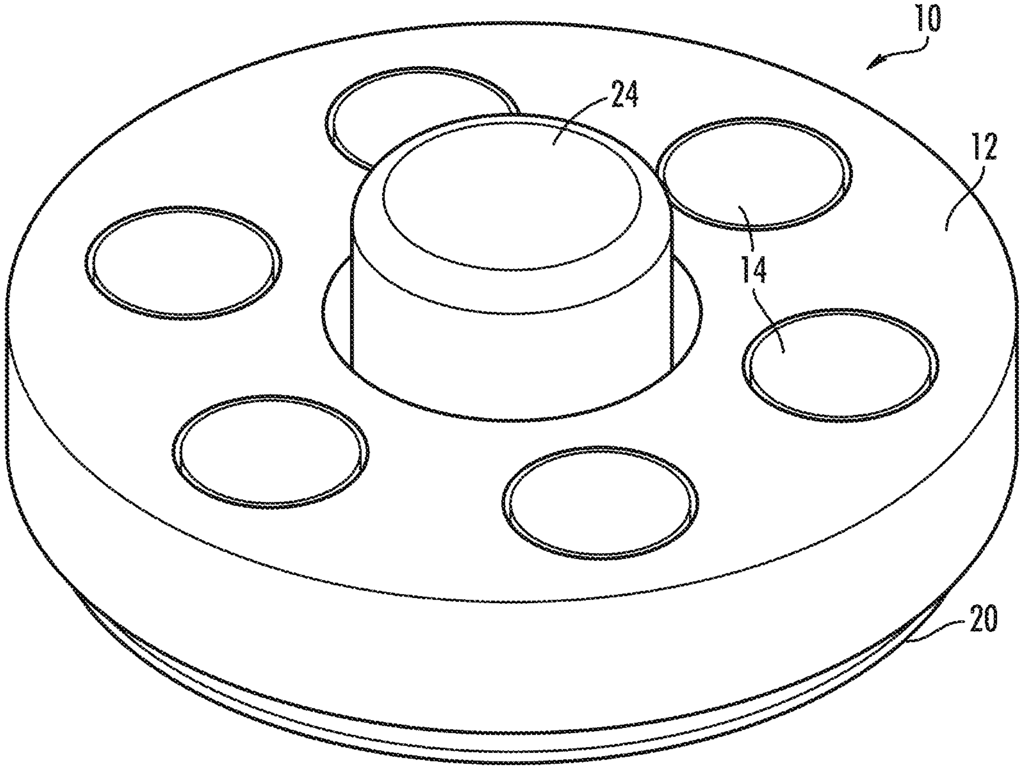
FIG. 4 is a side perspective view of the magnetic assembly of the present invention encircling an exemplary pole piece of a motor assembly.
Figure 5:
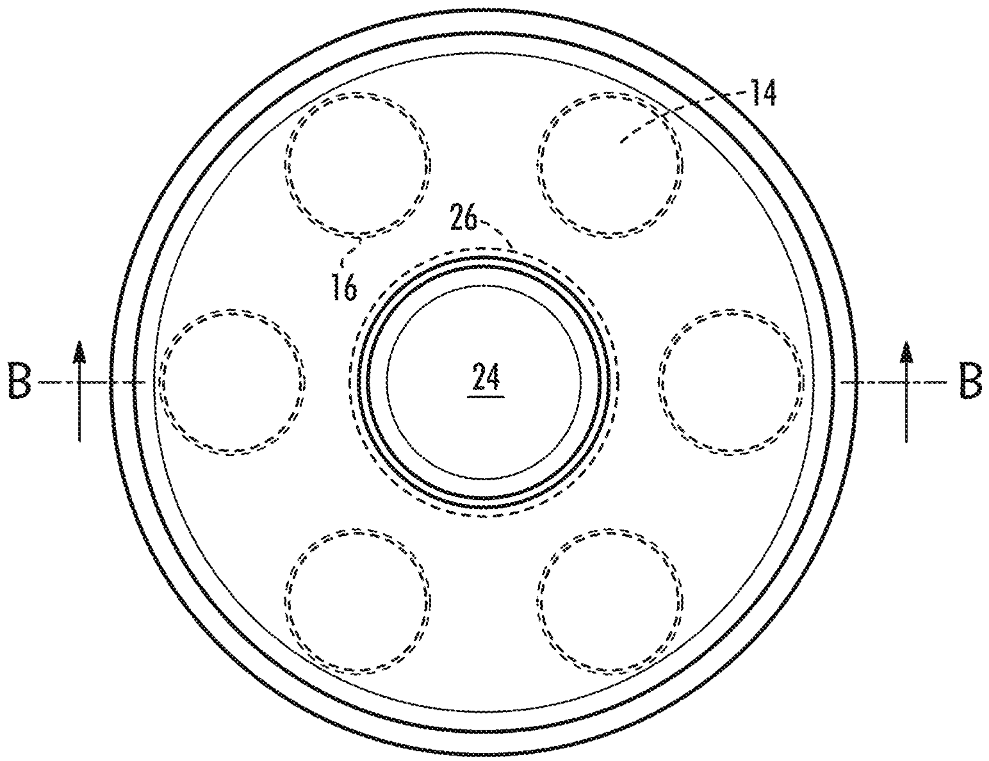
FIG. 5 is a top view of the magnet assembly of the present invention encircling an exemplary pole piece of a motor assembly.
Figure 6:
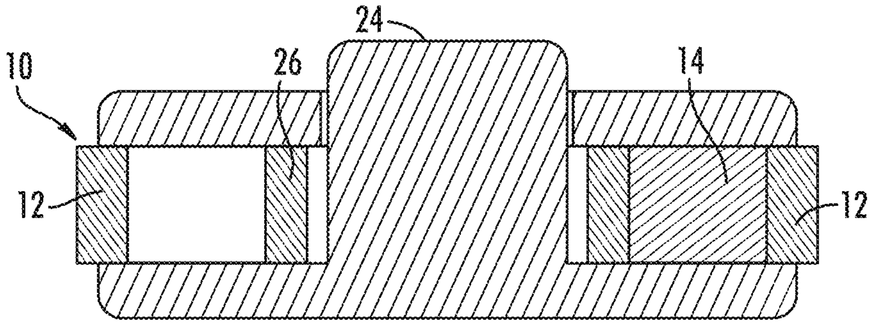
FIG. 6 is a cut-away view of the magnet assembly of FIG. 5 along the line B-B.
Figure 7:
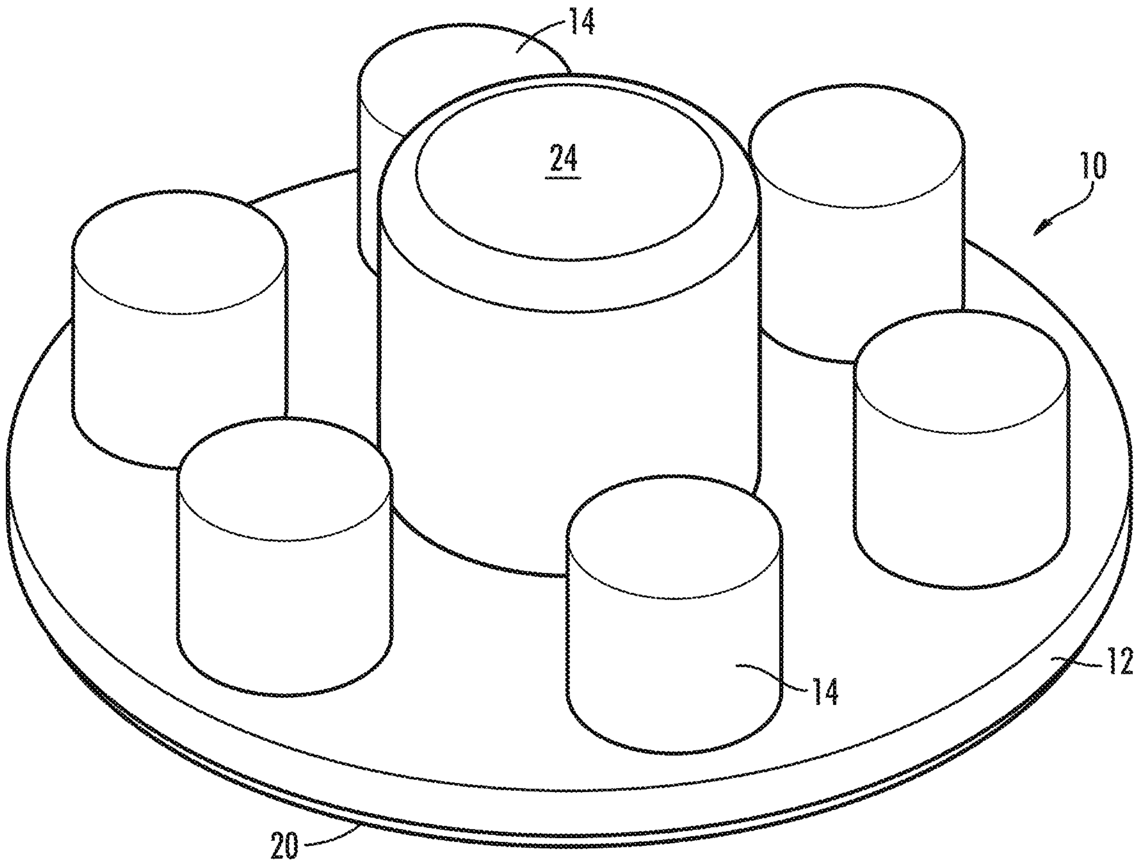
FIG. 7 is a perspective view of the magnet assembly of the present invention with a portion of the plate member removed illustrating magnets disposed within the bores.

The magnets 14 are designed to be received within the bores 16 of the plate member 12. The bores 16 are preferably cylindrical with a circular cross-section and a cylindrical cavity for receiving and positioning magnets 14 therein, as shown in FIG. 3. The magnets 14 are preferably cylindrical with a circular cross-section. The diameter of the bores 16 is slightly larger than the diameter of the magnets 14, allowing the magnets 14 to be received within the bores 16. The magnets 14 may correspond to the length of the bore 16, which is defined as the length from the first end of the bore 16 to the second end of the bore 16. The first end of the bore 16 is adjacent the upper surface of the plate member 12, and preferably forming the opening of the bore 16. The first end of the bore 16 contains the opening to the cylindrical cavity of the bore 16 for receiving the magnets 14 for each respective bore 16. FIG. 7 shows the arrangement of magnets 14 within the plate member 12 with a portion of the plate member 12 removed to more readily view the magnets 14 and arrangement. As shown in FIG. 4, the first end of the magnet 14 is preferably flush with the upper surface of the plate member 12, meaning the first end of the magnet 14 is in a planar relationship with the upper surface of the plate member 12 and does not extend below or above the plane of the upper surface of the plate member 12, as shown in FIGS. 4-6, and 8. Alternatively, the first end of the magnet 14 may extend below or extend above the plane of the upper surface of the plate member 14.

Figure 9:
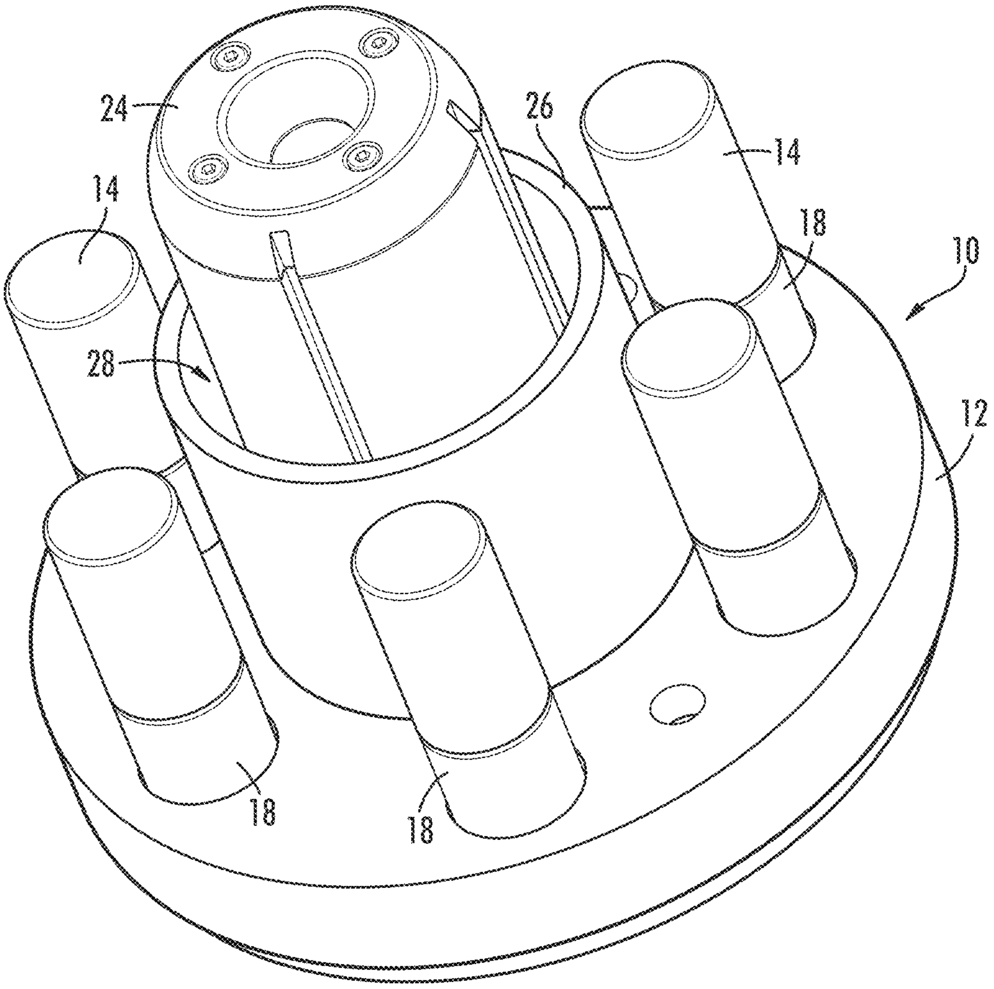
FIG. 9 is a perspective view of an alternative embodiment of the magnet assembly of the present invention with a portion of the plate member removed illustrating the magnets engaged to the stands.
Figure 10:
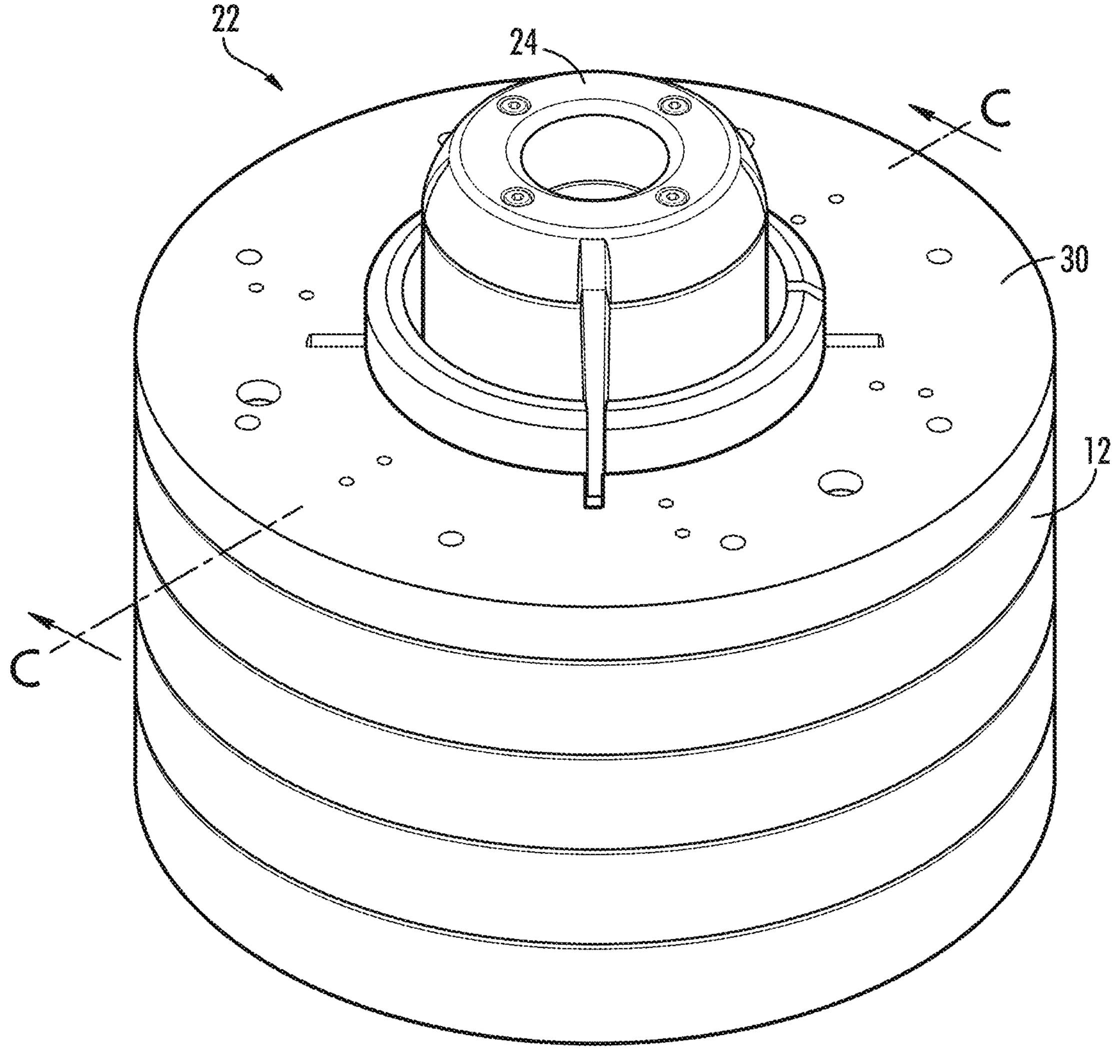
FIG. 10 is a perspective view of an exemplary motor assembly containing a magnet assembly of the present invention.
Figure 11:
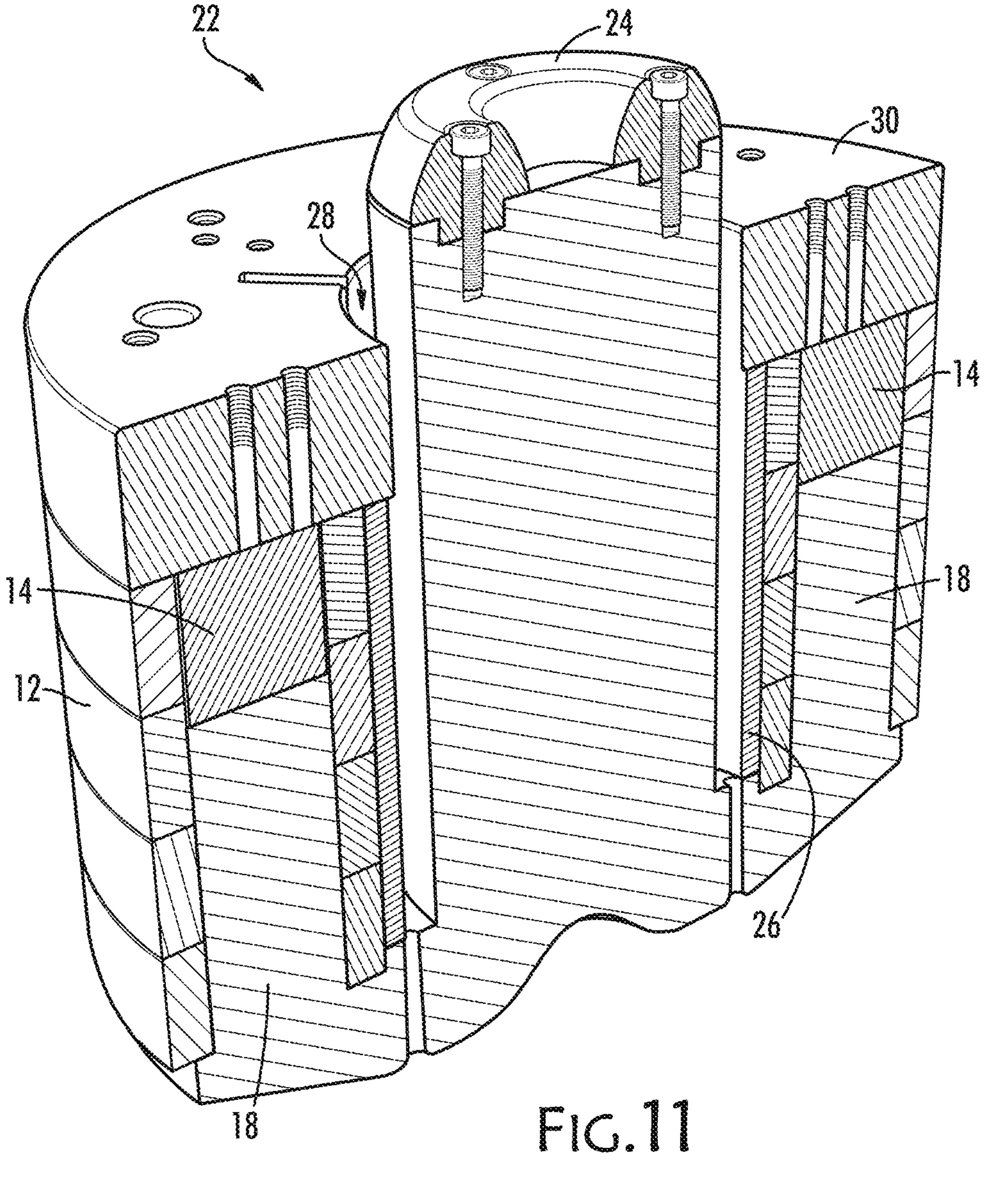
FIG. 11 is a cut-away view of the exemplary motor assembly of FIG. 10 along the line C-C showing an exemplary embodiment of the magnet assembly of the present invention.

Alternatively, a stand 18 may be disposed within the cylindrical cavity of each bore 16, as shown in FIGS. 9 and 11. The stand 18 may be cylindrical as illustrated with a circular cross-section with a diameter slightly smaller than the diameter of the bore 16, allowing the stand 18 to be positioned within the cylindrical cavity of the bore 16. The stand 18 may have any other structure that allows the stand 18 to be positioned within the cylindrical cavity of the bore 18. The stand 18 has a length that is less than the length of the bore 16, wherein the stand occupies a portion of the cylindrical cavity of the bore 16 and does not occupy the entire cylindrical cavity, allowing a magnet 14 to also be positioned or disposed within the cylindrical cavity of the bore 16. A magnet 14 has a first end and a second end, wherein the second end of the magnet 14 is positioned adjacent and in contact with the stand 18 and the first end, opposed to the second end, of the magnet 14 extends upwards towards the first end of the bore 16. The stand 18 may be composed of any material that allows a magnet 14 to sit atop the stand 18 without sacrificing the stability of the stand 18. Preferably, the stand 18 has no magnetizing capabilities and does not interfere with the magnetizing properties of the magnets 14 and/or plate member 12. FIG. 9, shows the plate member 12 partially removed and exposing the stands 18 and magnets 14. In operation, the magnet assembly 10 will appear as shown in FIGS. 10 and 11, wherein the second end of the magnets 14 are adjacent the opening of the bores 16 when stands 18 are utilized and the first end of the magnets 14 sit atop or contact the top portion of the stands 18. The stands 18 are beneficial when the plate member 12 has a width and it is not necessary for the magnets 14 to have the same or similar length to the width of the plate member 12. The stands 18 allow for a magnet 14 that has a length that is less than the width of the plate member 12 without decreasing the functionality of the magnet 14. In many cases, the stands 18 allow for the magnet 14 to have a length substantially less than the width of the plate member 12, without decreasing the functionality of the magnet 14, and at a substantial cost savings because the magnet 14 contemplated by this invention can be costly.

A bottom piece 20 may be disposed adjacent the bottom surface of the plate member 12, as shown in FIG. 7. The bottom piece 20 is generally circular and may have the same diameter of the plate member 12. Alternatively, the bottom piece 20 may have a diameter slightly smaller or slightly larger than the diameter of the plate member 12. The bottom piece 20 may assist in retaining the magnets 14 within the bores 16 by covering or enclosing an opening within the second end of the bore 16. In this instance, the bore 16 extends from the upper surface to the bottom surface of the plate member 12, and the bottom piece 20 is disposed adjacent the bottom surface of the plate member 12, covering or enclosing the opening at the second end of the bore 16, preventing the magnet 14 from exiting the opening in the second end of the bore 16. A stand 18 may also be engaged to the bottom piece 20 when the stand 18 is positioned within the cylindrical cavity of the bore 16. The first end of the stand 18 maybe engaged to the top surface of the bottom piece 20 and the second end of the stand 18 and substantially the remainder of the stand 18 is disposed within the cylindrical cavity of the bore 16 for positioning a magnet 14 thereon.

The magnet assembly 10 is designed for inclusion within a motor assembly 22, as generally shown in FIG. 10, wherein the magnet assembly 10 encircles a pole piece 24, as shown in FIG. 11. FIGS. 3-9 illustrate the magnet assembly 10 surrounding a pole piece 24 to show the placement of the magnet assembly 10 around a pole piece 24. The pole piece 24 generally extends upward from the interior portion of the bottom portion 14 of the motor assembly 22. The pole piece 24 is generally circular and has a first end and a second end. The pole piece 24 is centrally located within the housing of the motor assembly 22.

An optional shorting ring 26 may be disposed adjacent the internal side portion of the plate member 12 and has an interior surface, an exterior surface, and two opposed side surfaces, as illustrated in FIGS. 3, 5, 6, 8, 9, and 11. An air gap 28 is located between the pole piece 24 and the interior surface of the shorting ring 26. The exterior surface of the shorting ring 26 is engaged to the internal side portion of the plate member 12. One of the opposed side surfaces is disposed adjacent the interior portion of the bottom portion 14, or alternatively, the top surface of the bottom piece 20. The interior surface of the shorting ring 26 faces the air gap 28. The shorting ring 26 encircles the pole piece 24 and is spaced-apart from the pole piece 24 with the air gap 28 therebetween. The shorting ring 26 is generally circular and surrounds the pole piece 24. The shorting ring 26 is composed of a conductive metal, such as aluminum or copper. The shorting ring 26 reduces AC inductance.

As illustrated in FIG. 11, the housing of the motor assembly 22 contains a top portion 30, wherein the interior side of the top portion 30 of the housing may be adjacent a side of the shorting ring 26 and the upper surface of the plate member 12. The housing of the motor assembly 22 is preferably composed of steel, but may be composed of another material as desired by the user.

Figure 8:
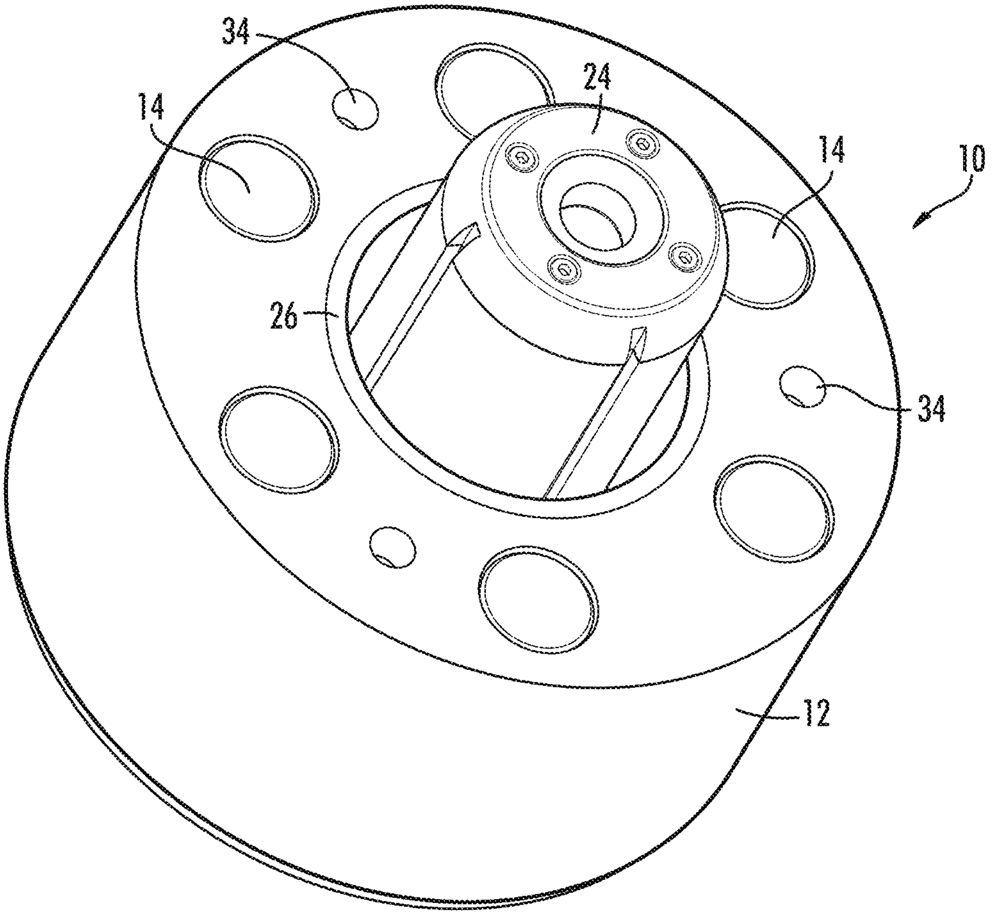
FIG. 8 is a perspective view of an alternative embodiment of the magnet assembly of the present invention.

At least one hole 34 is formed within the plate member 12 for venting. The hole 34 extends from the upper surface to the lower surface of the plate member 12 and has a circular cross-section. As shown in FIGS. 3 and 8, the plate member 12 may contain three, equally spaced-apart holes 34 that may be used to engage the plate member 12 to the bottom piece 20.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A magnet assembly for a speaker device, comprising:

a plate member with a plurality of cylindrical bores extending from an upper surface to a lower surface of the plate member, each cylindrical bore having an opening at the upper surface of the plate member;

a plurality of non-magnetic cylindrical stands, each disposed within a respective cylindrical bore and extending from the lower surface of the plate member to a position spaced from the upper surface, thereby defining a void within each cylindrical bore between the upper surface and the stand; and a plurality of cylindrical magnets, each positioned within a respective cylindrical bore and adjacent to the stand, such that the magnet substantially occupies the void between the upper surface and the stand.

2. The magnet assembly for a speaker device according to claim 1, wherein the cylindrical magnets are a neo-magnet.

3. The magnet assembly for a speaker device according to claim 1, wherein the plate member is composed of steel.

4. The magnet assembly for a speaker device according to claim 1, further comprising a shorting ring disposed adjacent an internal side portion of the plate member.

* * * * *